United States Patent [19]

Weber, Jr.

[11] Patent Number: 4,656,237

[45] Date of Patent: Apr. 7, 1987

[54] HIGH SOLIDS ACRYLIC COATING SYSTEMS

[75] Inventor: Robert J. Weber, Jr., Belle Mead, N.J.

[73] Assignee: Union Carbide Corporation, Danbury, Conn.

[21] Appl. No.: 694,234

[22] Filed: Jan. 24, 1985

Related U.S. Application Data

[62] Division of Ser. No. 547,015, Oct. 31, 1983, Pat. No. 4,524,183.

[51] Int. Cl.$^4$ .................... C08F 120/26; C07C 69/52
[52] U.S. Cl. .................................... 526/320; 526/181; 526/212; 560/205

[58] Field of Search ............... 526/212, 236, 181, 320, 526/318, 217; 560/205, 209

[56] References Cited

U.S. PATENT DOCUMENTS 3,285,894 4/1966 Lim et al. ............................ 526/212
4,158,736 6/1979 Lewis et al. ........................ 526/212

*Primary Examiner*—Theodore E. Pertilla
*Attorney, Agent, or Firm*—Jean B. Mauro

[57] ABSTRACT

High solids acrylic coating compositions are formulated by using as a reactive diluent, a low molecular weight hydroxyl-containing acrylic polymer. These polymers are prepared at about 15°–20° C. with anionic initiator concentrations greater than about 5 mole percent.

1 Claim, No Drawings

HIGH SOLIDS ACRYLIC COATING SYSTEMS

This application is a division of prior U.S. application Ser. No. 547,015, filed Oct. 31, 1983, now U.S. Pat. No. 4,524,183 issued June 18, 1985.

BACKGROUND OF THE INVENTION

This invention pertains to high solids acrylic coating systems and more particularly to the use of low molecular weight hydroxyl-containing acrylic polymers as reactive diluents.

The U.S. Environmental Protection Agency has lowered the allowable solvent emission limits for the coatings industry and intends to make them more stringent in the future. Several ways to lower the solvent emissions from coatings is to recover the solvent in the emissions or to incinerate the emissions. Other alternatives are waterborne coatings where the emission of water is, of course, allowable or high solids coatings which contain much less solvent than conventional coatings and may meet the emission guidelines. The recovery or incineration of solvent emissions requires a great investment of capital in equipment and waterborne coatings, while applicable in certain areas, do not possess good outdoor weatherability and are deficient in other properties. According to the above facts, the only viable high performance system is high solids coatings.

There are several ways to prepare high solids coatings systems. By reducing the molecular weight of the polymer that comprises the coating, the viscosity for a given solids content can be lowered. Also, a system where the solvent does not evaporate but reacts with the resin system to become part of the coating can be used. This is usually termed a reactive diluent. In the former case, lowering the molecular weight of the polymer causes a deterioration in the properties of the coating. Therefore, the best approach to high solids coating is the reactive diluent.

Acrylic resins are very common and widely used in the coatings industry and are almost exclusively used by one of the major consumers of coatings, the automotive industry. Also, one of the most common crosslinking reactions for acrylic polymers used in coatings is the reaction of hydroxyl groups on the polymer with crosslinking agents such as formaldehyde-melamine condensates and isocyanates.

SUMMARY OF THE INVENTION

An improved high solids coating composition comprising an acrylic resin, crosslinking agent, reactive diluent and crosslinking catalyst, has been developed. The improvement lies in using as the reactive diluent a low molecular weight, hydroxyl-containing acrylic polymer prepared by contacting one more acrylic or methacrylic acid alkyl esters (at least one of which is an hydroxyalkyl ester of acrylic or methacrylic acid) with an anionic initiator in an inert solvent (such as dialkyl ethers or aromatic hydrocarbons) at a temperature of about 15° to about 20° C., wherein the alkyl groups contain 1 to about 6 carbons and the initiator concentrations is >5 mole % based on the total monomer charge, and then quenching the polymerization reaction.

DESCRIPTION OF THE INVENTION

Representative hydroxyalkyl esters of acrylic or methacrylic acid include:
2-hydroxyethyl acrylate
2-hydroxyethyl methacrylate
3-hydroxypropyl acrylate
3-hydroxypropyl methacrylate
4-hydroxybutyl acrylate
4-hydroxybutyl methacrylate
2-hydroxy-1-methylethyl acrylate
2-hydroxy-1-methylethyl methacrylate,
and the like.

Suitable acrylic or methacrylic acid alkyl esters include:
methyl acrylate
methyl methacrylate
ethyl acrylate
ethyl methacrylate
n-propyl acrylate
n-propyl methacrylate
isopropyl acrylate
isopropyl methacrylate
n-butyl acrylate
n-butyl methacrylate
n-pentyl acrylate
n-pentyl methacrylate
n-hexyl acrylate
n-hexyl methacrylate
isohexyl acylate
isohexyl methacrylate,
and the like.

Suitable anionic polymerization initiators include alkali metal alkoxides, such as potassium, sodium or lithium methoxide, ethoxide, propoxide, isopropoxide, butoxide, and the like. The preferred initiator is potassium t-butoxide.

The preferred crosslinking agents are the melamine-formaldehyde adducts, such as hexamethoxymethylmelamine sold commercially by American Cyanamid as Cymel 303. Other crosslinking agents that can be used include: isocyanates, epoxides, and the like.

The polymerization reaction can be quenched by organic acids, such as, acetic acid, propionic acid, and the like. Any acidic neutralizing agent, however, can be used.

While not essential, it is preferred to conduct the polymerization reaction in an inert organic solvent or solvent mixture. Useful solvents include aromatic hydrocarbons, as for example, benzene, toluene, xylene, and the like; aliphatic ethers such as diethyl ether, tetrahydrofuran, and the like.

The number average molecular weight of the hydroxyl-containing polymers is in the range of oligomers, that is, about 500 to 1000.

Very low molecular weight hydroxyl functional acrylic resins have been prepared before, but in an indirect and a direct method. First, in the indirect method, acrylic esters were polymerized to a very low molecular weight and then these very low molecular weight acrylic polymers were either partially saponified to the acid and esterfied with a difunctional alcohol or transesterified directly with the difunctional alcohol. By adding the difunctional alcohol, a very low molecular weight acrylic resin was obtained that contained the requisite hydroxyl groups for crosslinking. The present invention eliminates the second step used above by directly copolymerizing a hydroxyl-containing acrylic monomer with other acrylic monomers. By this method, the hydroxyl groups necessary for crosslinking are introduced into the very low molecular weight acrylic polymer in one step.

In the direct method, it has been claimed that a mixture of hydroxyethyl acrylate, and an unfunctionalized acrylic monomer are added to a solution of an alkali metal alkoxide and allowed to polymerize, sometimes in the presence of a chain regulating alcohol. This method states that 0.5–5 mole percent of the initiator, based on the total moles of monomer, should be used. This amount of initiator may be adequate for the polymerization of non-hydroxyl functional monomers, but in the present invention it is shown that an amount of catalyst substantially greater than 5 mole percent, based on the total moles of monomer, is necessary to obtain resins with a hydroxyl functionality great enough to be useful in crosslinked coatings applications.

The invention is further described in the examples which follow. All parts and percentages are by weight unless otherwise specified.

METHOD A: "BLOCK" POLYMERIZATION

Example 1

"Block" Polymerization of 2-Hydroxyethyl Acrylate

Into a dried 3 liter 3-neck flask fitted with a mechanical stirrer, dropping funnel, thermometer, and a nitrogen inlet and outlet is charged 500 ml of commercially dry tetrahydrofuran. To this is added 112 g (1 mole) of potassium t-butoxide which dissolves to yield a cloudy solution. A solution of 116 g (1 mole) of 2-hydroxyethyl acrylate in 100 ml tetrahydrofuran is added dropwise at a rate which keeps the temperature below 30° C. After this addition is completed, 300 g (3 moles) of ethyl acrylate is added dropwise, again at such a rate that the temperature does not exceed 30° C. After this addition is completed, 116 g (1 mole) of 2-hydroxyethyl acrylate is added dropwise, again at such a rate that the temperature does not exceed 30° C. (During certain points of the additions, if the temperature was rising rapidly, intermittent cooling with ice-water was used to moderate the temperature.) Twelve minutes after the final addition of 2-hydroxyethyl acrylate, 60 g (1 mole) of acetic acid was added to neutralize any basic species present and quench the polymerization reaction. This also caused the reaction mixture to become cloudy due to the formation of a suspension of potassium acetate. The solids were removed by vacuum filtration and the tetrahydrofuran was separated from the filtrate by rotary evaporation under vacuum to yield 433 g of poly(2-hydroxyethyl acrylate) as a clear yellow oil (67.2% yield based on t-butoxide and acrylates charged). The product had a hydroxyl number of 190 mg KOH/g resin, an acid number of 14 mg KOH/g resin (determined by ASTM E222), a number average molecular weight ($M_N$)=600 and a weight average molecular weight ($M_w$)=2000 as determined by gel permeation chromotography.

The 2-hydroxyethyl acrylate copolymer prepared above was used as a reactive diluent and formulated with: an acrylic resin, AT-400 (75% solids), a copolymer of Rohm and Haas containing butyl acrylate, styrene, hydroxyethyl acrylate and acrylic acid polymerized in a weight ratio of 45:36:14:5 repectively; a melamine-formaldehyde type crosslinker, Cymel 303 (American Cyanamid); a sulfonic acid catalyst, Cycat 4040 (American Cyanamid); 2-heptanone; n-butanol into a high solids coating formulation. The specific formulation is:

| Component | Weight (g) |
|---|---|
| AT-400 | 93.3 |
| Cymel 303 | 47.0 |
| Reactive Diluent | 30.0 |
| Cycat 4040 | 3.3 |
| 2-heptanone | 4.75 |
| n-butanol | 4.95 |

The above components were blended thoroughly and the mixture was coated to a 4 mil wet thickness on Bonderite 100 steel panels. These panels were air dried for 20 minutes and then baked at 150° C. for 20 minutes. The properties of the final cured coating are given in Table 1.

Example 2

"Block" Polymerization of 2-Hydroxyethyl Acrylate and Ethyl Acrylate

This copolymer was prepared by the procedure described in Example 1 except that the following amounts of materials were used:

| Initial Charge: | potassium t-butoxide (in 300 ml tetrahydrofuran) | 84 g |
|---|---|---|
| Portion 1: | 2-hydroxyethyl acrylate (in 100 ml tetrahydrofuran) | 87 g |
| Portion 2: | ethyl acrylate (in 100 ml tetrahydrofuran) | 150 g |
| Portion 3: | 2-hydroxyethyl acrylate (in 100 ml tetrahydrofuran) | 87 g |
| Portion 4: | ethyl acrylate | 150 g |
| Portion 5: | 2-hydroxyethyl acrylate | 87 g |
| Portion 6: | acetic acid | 45 g |

Before filtration, 50 g of Celite 545 (filter aid, Johns-Manville) was added to make the filtration more rapid. After removal of the tetrahydrofuran, 460 g of a dark yellow oil remained (71.3% yield). This copolymer had an hydroxyl number of 221 mg KOH/g resin and an acid number of 10 mg KOH/g resin.

The copolymer made above was formulated into a high solids coating material according to the procedure described in Example 1 with the following materials:

| Component | Weight (g) |
|---|---|
| AT-400 | 93.3 |
| Cymel 303 | 50.8 |
| Reactive Diluent | 30.0 |
| Cycat 4040 | 3.3 |
| 2-heptanone | 4.75 |
| n-butanol | 4.95 |

This coating material was applied and cured as in Example 1 to give the properties in Table 1.

Example 3

"Block" Polymerization of 2-Hydroxyethyl Acrylate

A copolymer was prepared using the method described in Example 1 except that the following amounts of materials were used:

| Initial Charge: | potassium t-butoxide (in 300 ml tetrahydrofuran) | 56 g |
|---|---|---|
| Portion 1: | 2-hydroxyethyl acrylate (in 75 ml tetrahydrofuran) | 58 g |
| Portion 2: | ethyl acrylate (in 75 ml tetrahydrofuran) | 100 g |

-continued

| Portion 3: | 2-hydroxyethyl acrylate (in 50 ml tetrahydrofuran) | 58 g |
|---|---|---|
| Portion 4: | ethyl acrylate | 100 g |
| Portion 5: | 2-hydroxyethyl acrylate | 58 g |
| Portion 6: | ethyl acrylate | 100 g |
| Portion 7: | 2-hydroxyethyl acrylate | 58 g |
| Portion 8: | acetic acid | 30 g |

As in Example 2, 52 g of Celite was added before filtration and after removal of the solvent there remained 417 g of a dark yellow oil (70.9% yield). The copolymer had an hydroxyl number of 193 mg KOH/g resin and an acid number of 8 mg KOH/g resin.

The copolymer prepared above was formulated into a coating material according to Example 1 with the following materials:

| Component | Weight (g) |
|---|---|
| AT-400 | 93.3 |
| Cymel 303 | 47.8 |
| Reactive Diluent | 30.0 |
| Cycat 4040 | 3.3 |
| 2-heptanone | 4.75 |
| n-butanol | 4.95 |

This coating material was applied and cured as in Example 1 to give the properties in Table 1.

Example 4

"Block" Copolymer of 2-Hydroxyethyl Acrylate and t-Butyl Acrylate

This copolymer was prepared as in Example 1 except that the following materials in the stated amounts were used:

| Initial Charge: | potassium t-butoxide (in 200 ml tetrahydrofuran) | 11.2 g |
|---|---|---|
| Portion 1: | 2-hydroxyethyl acrylate (in 25 ml tetrahydrofuran) | 11.6 g |
| Portion 2: | t-butyl acrylate (in 25 ml tetrahydrofuran) | 25.6 g |
| Portion 3: | 2-hydroxyethyl acrylate (in 25 ml tetrahydrofuran) | 11.6 g |
| Portion 4: | acetic acid | 6.0 g |

After filtration and evaporation, there remained 37 g (61.6% yield) of a light opaque grey oil that separated into two layers upon standing. Further uses of this material was preceded by vigorous shaking to ensure homogeneity. This copolymer has an hydroxyl number of 208 mg KOH/g resin and an acid number of 25 mg KOG/g resin.

The copolymers prepared above were formulated into a coating material according to Example 1 with the following materials:

| Component | Weight (g) |
|---|---|
| AT-400 | 59.11 |
| Cymel 303 | 31.2 |
| Reactive Diluent | 19.0 |
| Cycat 4040 | 1.06 |
| 2-heptanone | 3.0 |
| n-butanol | 3.14 |

This coating material was applied and cured according to Example 1 to give the properties in Table 1.

Example 5

"Block" Copolymer of 2-Hydroxyethyl Acrylate and Isopropyl Acrylate

This copolymer was prepared as in Example 1 except that the following materials were used in the amounts stated:

| Initial Charge: | potassium t-butoxide (in 200 ml tetrahydrofuran) | 11.2 g |
|---|---|---|
| Portion 1: | 2-hydroxyethyl acrylate (in 25 ml tetrahydrofuran) | 11.6 g |
| Portion 2: | isopropyl acrylate (in 50 ml tetrahydrofuran) | 22.8 g |
| Portion 3: | 2-hydroxyethyl acrylate (in 25 ml tetrahydrofuran) | 11.6 g |
| Portion 4: | acetic acid | 6.0 g |

After filtration and evaporation, there remained 39 g (68.2% yield) of a yellow opaque oil that separated into two layers upon standing. Further uses of this material was preceded by vigorous shaking to ensure homogeneity. This copolymer had an hydroxyl number of 226 mg KOH/g resin and an acid number of 25 mg KOH/g resin.

The copolymer prepared above was formulated into a coating material according to Example 1 with the following materials:

| Component | Weight (g) |
|---|---|
| AT-400 | 93.3 |
| Cymel 303 | 51.2 |
| Reactive Diluent | 30.0 |
| Cycat 4040 | 1.66 |
| 2-heptanone | 4.75 |
| n-butanol | 4.95 |

This coating material was applied and cured according to Example 1 to give the properties in Table 1.

METHOD B: Random Polymerization

Example 2B

Polymerization of 2-Hydroxyethyl Acrylate and Ethyl Acrylate

Into a dry 2 liter 3-neck flask fitted with a mechanical stirrer, thermometer, dropping funnel and nitrogen inlet and outlet was charged 200 ml of commercially dry tetrahydrofuran. To this is added 56 g (0.5 mole) potassium t-butoxide which dissolved to yield a cloudy solution. A solution of 200 g (2 moles) of ethyl acrylate and 174 g (1.5 moles) of 2-hydroxyethyl acrylate in 200 ml tetrahydrofuran was added dropwise at such a rate that the temperature was maintained between 20°-30° C. (An ice-water mixture was used intermittently to aid in controlling the temperature.) After this addition was complete, 30 g (0.5 mole) acetic acid was added to neutralize any basic species present and also caused the reaction mixture to cloud with a suspension of potassium acetate. The solid was removed by vacuum filtration and the tetrahydrofuran was removed by rotary evaporation under vacuum to yield 294 g of a clear yellow oil (68.4% yield based on t-butoxide and acrylates charged). The copolymer product had a hydroxyl number of 151 mg KOH/g resin and an acid number of 16 mg KOH/g resin.

The random copolymer prepared above was formulated into a coating material according to Example 1 with the following materials:

| Component | Weight (g) |
| --- | --- |
| AT-400 | 93.3 |
| Cymel 303 | 42.4 |
| Reactive Diluent | 30.0 |
| Cycat 4040 | 2.5 |
| 2-heptanone | 4.75 |
| n-butanol | 4.95 |

This coating material was applied and cured as in Example 1 to give the properties in Table 1.

Example 3B

This random copolymer was prepared in the same manner as that in Example 2B except the following materials were used in the amounts stated:

| Initial Charge: | potassium t-butoxide (in 200 ml tetrahydrofuran) | 56 g |
| --- | --- | --- |
| Portion 1: | ethyl acrylate | 300 g |
| | 2-hydroxyethyl acrylate (in 300 ml tetrahydrofuran) | 232 g |
| Portion 2: | acetic acid | 30 g |

After filtration and evaporation, there remained 435 g (74.0% yield) of a dark yellow oil. This material had a hydroxyl number of 129 mg KOH/g resin and an acid number of 15 mg KOH/g resin.

The random copolymer prepared above was formulated into a coating material according to Example 1 with the following materials:

| Component | Weight (g) |
| --- | --- |
| AT-400 | 93.3 |
| Cymel 303 | 39.6 |
| Reactive Diluent | 30.0 |
| Cycat 4040 | 2.5 |
| 2-heptanone | 4.75 |
| n-butanol | 4.75 |

This coating material was applied and cured as in Example 1 to give the properties in Table 1.

OBSERVATIONS

The data in Table 1 shows that Method B (random polymerization) is the preferred method. Comparison of Example 2 ("block" polymerization) and Example 2B (random polymerization) reveals that there is less of a difference in theoretical solids and actual solids for the reactive diluent in Example 2B as compared with Example 2 (80.6 and 73.6 versus 81.3 and 70.3, respectively) even though these two reactive diluents contain the same ratio of hydroxyethyl acrylate to ethyl acrylate and their polymerization was initiated by the same amount of potassium t-butoxide. Also, the water resistance to Example 2B is higher than that of Example 2 and the viscosity reduction of Example 2B is greater than that of Example 2. These facts are also true when the same comparisons are made between Example 3 and Example 3B.

Although the initiator used in these examples is potassium t-butoxide, any potassium alkoxide (e.g., isopropoxide, ethoxide, methoxide) could induce the polymerization. However, the potassium ion is believed to be important since studies in other areas of anionic polymerization of acrylates have shown that potassium ion is better than sodium which is better than lithium.

Examples 6 through 12

These Examples were performed in a manner similar to Example 2B (random polymerization) using the relative amounts of potassium t-butoxide, ethyl acrylate and hydroxyethyl acrylate given in Table 2. The properties of the resulting resins are given in Table 2.

The present invention involves the anionic copolymerization of acrylic esters where one of the co-monomers is hydroxyalkyl ester of acrylic acid, more specifically, 2-hydroxyethyl acrylate. In this method a suitable anionic initiator such as an alkali metal alkoxide, more specifically, potassium t-butoxide, is dissolved in a solvent such as tetrahydrofuran. The solution of initiator is then treated with a mixture of acrylate ester monomers, usually in a solvent. Since the anionic polymerization is usually exothermic, it has been found advantageous to use cold water to externally cool the reaction and maintain the temperature at approximately 15°–20° C. After all of the monomers have been added and allowed to react for a sufficient period of time, usually one hour, an acid is added to quench any residual initiator, the polymer chain ends, and any other basic materials. The resulting salts are filtered and the solvent is removed under vacuum to yield the low molecular weight polymer. If desired, very low molecular weight materials (monomer, dimer) that were not removed by vacuum stripping can be removed by extracting the product with a solvent that dissolves these low molecular weight materials but not the oligomer. Such solvents are pentane, hexane, cyclohexane and the like.

Although 15°–25° C. is the recommended temperature for the preparation of these reactive diluents, temperatures above and below this can be used. However, the use of lower temperatures slows the reaction rate and therefore lengthens reaction times and these lower temperatures would be more difficult to use in large scale production. Higher temperatures give a faster reaction rate but have the severe disadvantage of producing a reactive diluent with much higher color. The material prepared at 15°–25° C. has a light yellow color, whereas the material prepared at 40°–50° C. has a dark yellow, almost orange color. This dark colored reactive diluent would not be suitable for the preparation of coatings utilizing light colored pigments (white, pale blue, etc.). Higher temperatures than 45° C. have resulted in higher viscosities (i.e. higher molecular weights) which is also undesirable.

Although the above method gives the best results, a second method can be used. This method is the same as that used above except that the co-monomers are added separately in a sequential manner. Thus the reactor would be charged with the solvent and the anionic initiator and then monomer A would be added. When this addition is complete, monomer B is added. Next, another monomer, monomer C, can be added or a second charge of monomer A could be used depending on the desired composition of the polymer. Alternating additions of monomer A, B, and so on can be continued to obtain the polymer of the desired composition. The reaction is then quenched as described above.

Using either of the two methods described above, materials are obtained that are low viscosity and contain essentially no solvent. If one of the co-monomers used contains a hydroxyl group, such as 2-hydroxyethyl acrylate, then a low molecular weight, low viscosity polymer is obtained that can be used to lower the viscosity of conventional melamine-formaldehyde condensate, or isocyanate crosslinked coatings formulations. Besides lowering the viscosity of a coatings formulation, these low molecular weight polymers with their pendant hydroxyl groups react with the crosslinkers during the cure of the coating and are not volatilized as are conventional solvents used for reducing the viscosity of coatings.

In order to illustrate the utility of this invention, several examples have been presented describing the use of both polymerization techniques and several compositions for each method. Also, the use of these products as reactive diluents in conjunction with a commercial acrylic resin, Rohm and Haas AT-400, have been presented.

Table 2 shows the effect of the amount of potassium t-butoxide used in the polymerization on the hydroxyl number of the resulting polymer (oligomer). In examples 6 through 9 the molar ratio of hydroxyl functional monomer (hydroxyethyl acrylate) to non-functional monomer (ethyl acrylate) is held constant at 1:2 while the amount of potassium t-butoxide is decreased relative to the total monomer charge. As can be seen for examples 6-9, the actual hydroxyl number declines from 153 mg KOH/g resin to 28 mg KOH/g resin, whereas the theoretical hydroxyl number calculated from the ratio of monomers is 176 mg KOH/g resin. In this same series the percentage of potassium t-butoxide decreases from 10 mole percent to 4.5 mole percent. Further evidence for this effect is seen in examples 10 through 12 in Table 2. Here the amount of monomers is held constant and the percentage of potassium t-butoxide is increased from 13.6 mole percent to 24 mole percent. The hydroxyl number again increases from 87 mg KOH/g resin to 150 mg KOH/g resin with increasing amounts of potassium t-butoxide. The theoretical hydroxyl number calculated for this resin from the amounts of monomer charged is 142 mg KOH/g resin.

The variation in hydroxyl number with the change in amount of potassium t-butoxide used to initiate the polymerization can be explained by a chemical equilibrium between the initiator, potassium t-butoxide, and the hydroxyl functional monomer, hydroxyethyl acrylate. The hydroxyl group in hydroxyethyl acrylate is more acidic than that of t-butyl alcohol and conversely the alkoxide from t-butyl alcohol is more basic than the alkoxide from hydroxyethyl acrylate. These facts make it apparent that the following equilibrium that exits in the reaction being discussed should be to the right, consisting mainly of t-butyl alcohol and the alkoxide of hydroyethyl acrylate:

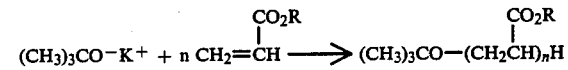

In a reaction where only a small amount of potassium t-butoxide (relative to hydroxyethyl acrylate) is used to initiate the reaction most of the anionic species in the early part of the reaction will be the alkoxide of hydroxyethyl acrylate. On there other hand, when a large amount of potassium t-butoxide is used to initiate the reaction, the composition of the anionic species early in the reaction will contain much more t-butoxide than in the former case. This difference in composition of the anionic species present in the reaction has a direct effect on the hydroxyl content of the final polymer.

In the case where a small amount of potassium t-butoxide is used in the polymerization and the anionic species are dominated by the alkoxide of hydroxyethyl acrylate, this alkoxide becomes the initiator producing polymers of the type:

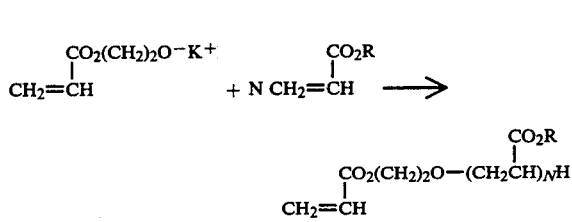

wherein R=alkyl or hydroxyalkyl

The hydroxyl containing component of the reaction that is expected to be the hydroxyl containing component of the final polymer (oligomer) has been used to initiate the reaction and becomes an ether in the final polymer (oligomer). Therefore, the hydroxyl number of the final product is reduced as compared to the theoretical hydroxyl number based on the monomers charged.

In the case where a large amount of potassium t-butoxide is used in the polymerization and the anionic species are dominated by t-butoxide, this alkoxide becomes the initiator producing polymers of the type:

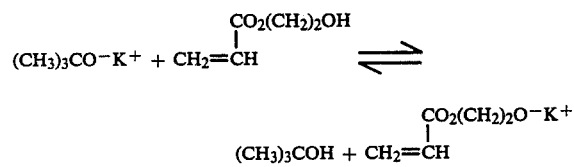

R=alkyl or hydroxyalkyl

The hydroxyl containing component of the monomers, hydroxyethyl acrylate, is not the initiator under conditions of large amounts of t-butoxide and, therefore, becomes the hydroxyl containing component of the final polymer (oligomer). Therefore, when large amounts of t-butoxide (relative to hydroxyethyl acrylate) are used, the hydroxyl content (hydroxyl number) of the final polymer (oligomer) approaches the value calculated from the monomers charged.

The low hydroxyl content of the resins obtained with low amounts of potassium t-butoxide used as an initiator are not as suitable for use in crosslinking coatings as those prepared with large amounts of potassium t-butoxide. In example 7 the resin has a hydroxyl number of 57 mg KOH/g resin which yields an equivalent weight of 984 g resin/equivalent hydroxyl. Using the number average molecular weight of the resin in Example 7, 660/g mole, and the above calculated equivalent weight, 984 g/hydroxyl, yields a functionality of 0.671 hydroxyls/molecule. This implies that, on the average, one-third of the molecules in this resin have no hydroxyl functionality. In comparison, the same calculations show that the resin in Example 6 contains, on the average, 1.74 hydroxyls/molecule, nearly three times as many as the resin in Example 7. Obviously, the better crosslinking and retention of resin will be obtained with the resin with the higher hydroxyl number. Therefore, the use of potassium t-butoxide (or similar initiators) in an amount great enough to obtain suitable functionality is necessary for the production of a useful reactive diluent.

The examples presented herein use only melamine-formaldehyde adducts (specifically Cymel 303) for crosslinking the resin-reactive diluent combinations. These reactive diluents, because they contain hydroxyl groups, are crosslinkable with isocyanates, silanes, carbodiimides and any other crosslinking agent capable of reacting with hydroxyl groups.

TABLE I

PROPERTIES OF ACRYLIC COATINGS MODIFIED WITH REACTIVE DILUENTS

| EXAMPLE | REACTIVE DILUENT | $M_n/M_w$* | VISCOSITY (CPS) | % SOLIDS (THEORETICAL) | HARDNESS[a] (PENCIL) | WATER RESISTANCE** FWI | CH |
|---|---|---|---|---|---|---|---|
| CONTROL | NONE | — | 2950 | 73.0 (75.1) | H | 9-T-1 | 8-T-1 |
| 1 | HEA(EA)3HEA | 660 3700 | 1450 | 71.0 (80.9) | F | 9-T-1 | 8-T-1 |
| 2 | HEA(EA)2HEA(EA)2HEA | | 1350 | 70.3 (81.3) | F | 4-T-2 | 3-T-2 |
| 2B | (HEA)3(EA)4 | 630 2500 | 1250 | 73.6 (80.6) | F | 9-T-1 | 4-T-1 |
| 3 | HEA(EA)2HEA(EA)2HEA (EA)2HEA | | 1300 | 70.0 (80.9) | F | 6-T-2 | |
| 3B | (HEA)4(EA)6 | 640 | 1100 | 72.3 | F | 8-T-1 | 4-T-1 |
| 4 | HEA(TBA)2HEA | 630 2600 | 1500 | 72.9 (81.5) | F | 8-T-1 | 4-T-1 |
| 5 | HEA(IPA)2HEA | 560 6700 | 2100 | 71.4 (81.9) | F | 7-T-1 | 4-T-1 |

*DETERMINED BY GEL PERMEATION CHROMATOGRAPHY.
$M_n$ = Number average molecular weight
$M_w$ = Weight average molecular weight
**WATER RESISTANCE:
FWI, FRESH WATER IMMERSION AT ROOM TEMPERATURE FOR 1000 HR.;
CH, CLEVELAND HUMIDITY TEST AT 120° F. FOR 1000 HR.
RATING SYSTEM: 10-BEST, 0-WORST; T-1, CLOSED BLISTERS; T-2 OPEN BLISTERS
[a] Pencil Hardness scale is as follows: (softest) 6B . . . B, HB, F, H . . . 9H (Hardest).

TABLE 2

EFFECT OF POTASSIUM t-BUTOXIDE LEVEL ON THE HYDROXYL NUMBER OF REACTIVE DILUENT

| Example | Moles t-Butoxide (Mole %) | Moles HEA | Moles EA | Theory | Actual* | Mn | Mw |
|---|---|---|---|---|---|---|---|
| 6 | 1 (10%) | 3 | 6 | 176 | 153 | 640 | 2300 |
| 7 | 1 (7.7%) | 4 | 8 | 176 | 57 | 660 | 2600 |
| 8 | 1 (6.3%) | 5 | 10 | 176 | 46 ± 2 | 640 | 2800 |
| 9 | 1 (4.5%) | 7 | 14 | 176 | 28 ± 1 | 660 | 3060 |
| 10 | 1 (13.6%) | 1.66 | 4.67 | 142 | 87 | 560 | 1670 |
| 11 | 1.5 (19.2%) | 1.66 | 4.67 | 142 | 131 | 530 | 5510 |
| 12 | 2 (24.0%) | 1.66 | 4.67 | 142 | 150 | 820 | 3800 |

*Determined by ASTM E-222 (1979).

I claim:

1. The low molecular weight, hydroxyl-containing acrylic polymer prepared by contacting one or more acrylic or methacrylic acid alkyl esters at least one of which is an hydroxyalkyl ester of acrylic or methacrylic acid with an anionic polymerization initiator in an inert solvent at a temperature of about 15° to about 20° C. wherein the alkyl groups contain 1 to about 6 carbons and the initiator concentration is greater than about 5 mole % based on the total monomer charge and then quenching the polymerization reaction.

* * * * *